(12) United States Patent
Casazza et al.

(10) Patent No.: US 9,209,665 B2
(45) Date of Patent: Dec. 8, 2015

(54) FLUID-COOLED WIND TURBINE

(75) Inventors: Matteo Casazza, Val di Vizze (IT);
Georg Folie, Prato Allo Stelvio (IT);
Emmanuele Gelmini, Trento (IT)

(73) Assignee: WINDFIN B.V., Leimuiden (NL)

( * ) Notice: Subject to any disclaimer, the term of this patent is extended or adjusted under 35 U.S.C. 154(b) by 63 days.

(21) Appl. No.: 14/003,717

(22) PCT Filed: Mar. 10, 2012

(86) PCT No.: PCT/IB2012/051134
§ 371 (c)(1),
(2), (4) Date: Nov. 12, 2013

(87) PCT Pub. No.: WO2012/120485
PCT Pub. Date: Sep. 13, 2012

(65) Prior Publication Data
US 2014/0054897 A1      Feb. 27, 2014

(30) Foreign Application Priority Data

Mar. 10, 2011   (IT) .............................. MI2011A0376

(51) Int. Cl.
*F03D 9/00*    (2006.01)
*H02K 9/19*    (2006.01)
(Continued)

(52) U.S. Cl.
CPC *H02K 9/19* (2013.01); *F03D 9/002* (2013.01); *F03D 11/00* (2013.01); *H02K 1/2773* (2013.01); *H02K 1/32* (2013.01); *H02K 5/20* (2013.01); *H02K 7/1838* (2013.01);
(Continued)

(58) Field of Classification Search
CPC ...... F03D 11/00; F05B 2260/205; H02K 1/32
USPC ...... 290/44, 55; 415/4.1, 4.5; 310/60 A, 60 R
See application file for complete search history.

(56) References Cited

U.S. PATENT DOCUMENTS 3,225,231 A * 12/1965 Kudlacik ........................ 310/64
4,301,386 A * 11/1981 Schweder et al. ............. 310/59
(Continued)

FOREIGN PATENT DOCUMENTS

CA      2 379 161 A1    1/2001
DE   102004031329 A1    1/2006
(Continued)

OTHER PUBLICATIONS

International Search Report and Written Opinion for International Application No. PCT/IB2012/051134 dated Mar. 22, 2013.
(Continued)

*Primary Examiner* — Julio C. Gonzalez R.
(74) *Attorney, Agent, or Firm* — Neal, Gerber & Eisenberg LLP

(57) ABSTRACT

A fluid-cooled wind turbine has at least one electric machine, in turn having a stator with a stator supporting structure and a plurality of active stator sectors supported by the stator supporting structure, and a rotor which rotates about an axis of rotation and has a rotor supporting structure and a plurality of active rotor sectors supported by the rotor supporting structure; and a cooling system having a cooling circuit extending partly along a plurality of through channels adjacent to at least the active rotor sectors or the active stator sectors.

25 Claims, 6 Drawing Sheets

(51) Int. Cl.
*F03D 11/00* (2006.01)
*H02K 1/27* (2006.01)
*H02K 1/32* (2006.01)
*H02K 5/20* (2006.01)
*H02K 7/18* (2006.01)

(52) U.S. Cl.
CPC .... *F05B 2220/7066* (2013.01); *F05B 2260/20* (2013.01); *F05B 2260/205* (2013.01); *F05B 2260/232* (2013.01); *Y02E 10/722* (2013.01); *Y02E 10/725* (2013.01)

(56) References Cited

U.S. PATENT DOCUMENTS

| | | | | |
|---|---|---|---|---|
| 4,304,296 | A * | 12/1981 | Shaffer | 165/125 |
| 4,395,816 | A * | 8/1983 | Pangburn | 29/598 |
| 4,445,062 | A | 4/1984 | Glaser | |
| 4,456,842 | A * | 6/1984 | Tachibana | 310/61 |
| 6,087,745 | A * | 7/2000 | Dreher | 310/58 |
| 6,346,754 | B1 * | 2/2002 | Kieda et al. | 310/58 |
| 2004/0084976 | A1 * | 5/2004 | Thiot | 310/58 |
| 2006/0145484 | A1 | 7/2006 | Kruger-Gotzmann et al. | |
| 2007/0103027 | A1 | 5/2007 | Jansen et al. | |
| 2010/0140952 | A1 | 6/2010 | Jansen | |
| 2010/0176670 | A1 * | 7/2010 | Gottfried | 310/61 |

FOREIGN PATENT DOCUMENTS

| | | | | |
|---|---|---|---|---|
| DE | 102009025929 | A1 | 12/2010 | |
| EP | 1 371 845 | A2 | 12/2003 | |
| EP | 1 525 396 | | 4/2005 | |
| EP | 1 586 769 | A2 | 10/2005 | |
| EP | 1586769 | A2 * | 10/2005 | |
| EP | 1 837 519 | A2 | 9/2007 | |
| EP | 2031733 | A2 * | 3/2009 | ............... H02K 1/32 |
| EP | 2 136 077 | A2 | 12/2009 | |
| EP | 2 282 397 | A1 | 2/2011 | |
| WO | WO 2006/032969 | A2 | 3/2006 | |
| WO | WO 2009/034302 | A1 | 3/2009 | |
| WO | WO 2010/069954 | | 6/2010 | |
| WO | WO 2011/024760 | A1 | 3/2011 | |

OTHER PUBLICATIONS

Notification Concerning Submission, Obtention or Transmittal of Priority Document (Form PCT/IB/304) for International Application No. PCT/IB2012/051134 dated Jun. 6, 2012.
Response to International Search Report and the associated Written Opinion for International Application No. PCT/IB2012/051134 dated Jun. 21, 2013.
PCT Demand (Form PCT/IPEA/401) for International Application No. PCT/IB2012/051134.
Notification of Receipt of Demand by Competent International Preliminary Examining Authority (Form PCT/IPEA/402) for International Application No. PCT/IB2012/051134 dated Jul. 1, 2013.
Notification of Transmittal of the International Preliminary Report on Patentability (Form PCT/IPEA/416) for International Application No. PCT/IB2012/051134 dated Aug. 16, 2013.
International Preliminary Report on Patentability (Form PCT/IPEA/409) for International Application No. PCT/IB2012/051134 dated Aug. 16, 2013.

* cited by examiner

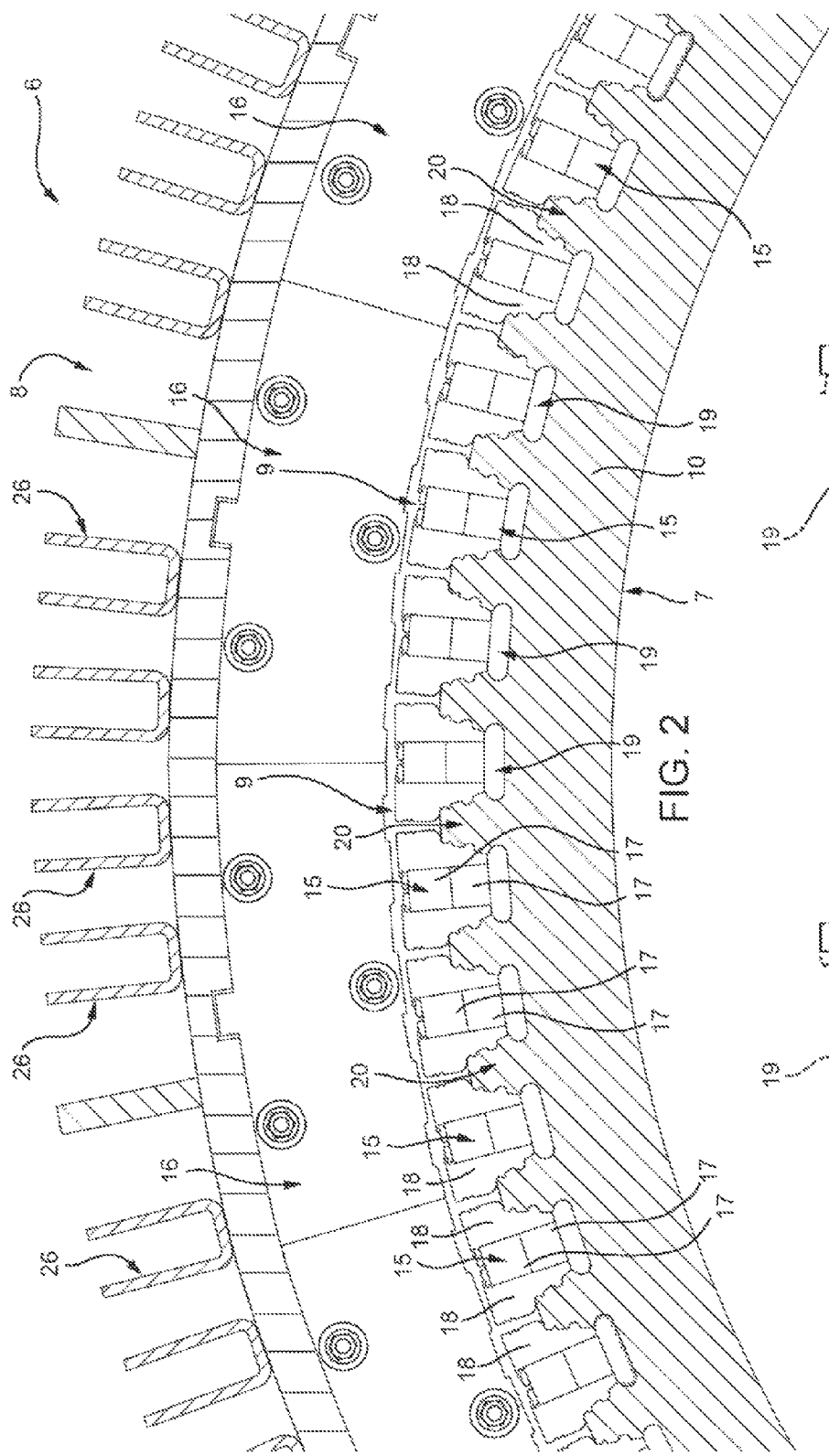

FLUID-COOLED WIND TURBINE

PRIORITY CLAIM

This application is a national stage application of PCT/IB2012/051134, filed on Mar. 10, 2012, which claims the benefit of and priority to Italian Patent Application No. MI2011A 000376, filed on Mar. 10, 2011, the entire contents of which are each incorporated by reference herein.

BACKGROUND

Certain known fluid-cooled wind turbines are described in European Patent No. EP 2,136,077; PCT Patent Application No. WO 2010/069954; European Patent No. EP 1525396; Canadian Patent No. CA 2379161; U.S. Published Patent Application No. 2006/0145484; U.S. Published Patent Application No. 2007/103027; European Patent No. EP 1837519 and European Patent No. EP 1586769.

Certain known cooling systems do not always effectively cool the electric machine when it is operated in particularly critical areas.

SUMMARY

The present disclosure relates to a fluid-cooled wind turbine.

More specifically, the present disclosure relates to a wind turbine comprising at least one electric machine, in turn comprising a stator comprising a stator supporting structure and a plurality of active stator sectors supported by the stator supporting structure, and a rotor which rotates about an axis of rotation and has a rotor supporting structure and a plurality of active rotor sectors supported by the rotor supporting structure; and a cooling system comprising a cooling circuit, in which a cooling fluid, such as air, circulates.

It is an advantage of the present disclosure to provide a highly effectively fluid-cooled wind turbine.

Another advantage of the present disclosure is to provide a straightforward, low-cost fluid-cooled wind turbine.

According to the present disclosure, there is provided a fluid-cooled wind turbine comprising at least one electric machine, in turn comprising a stator comprising a stator supporting structure and a plurality of active stator sectors supported by the stator supporting structure, and a rotor which rotates about an axis of rotation and has a rotor supporting structure and a plurality of active rotor sectors supported by the rotor supporting structure; and a cooling system comprising a cooling circuit extending partly along a plurality of through channels adjacent to at least the active rotor sectors or the active stator sectors; wherein the plurality of through channels comprise a plurality of straight through channels, each adjacent to a respective active rotor sector; wherein each active rotor sector comprises at least two rows of magnetized modules; the plurality of straight through channels comprising a plurality of intermediate through channels, each bounded by two rows of magnetized modules of a respective active rotor sector.

According to the present disclosure, the plurality of active rotor sectors are in direct contact with, and cooled by, a dedicated stream of cooling fluid.

In one embodiment of the disclosure, the plurality of through channels comprise an annular through channel extending about the axis of rotation and adjacent to the active rotor sectors and active stator sectors.

Additional features and advantages are described in, and will be apparent from the following Detailed Description and the figures.

BRIEF DESCRIPTION OF THE DRAWINGS

A number of non-limiting embodiments of the present disclosure will be described by way of example with reference to the accompanying drawings, in which:

FIG. 2 shows a larger-scale, partly sectioned front view, with parts removed for clarity, of a detail of the FIG. 1 wind turbine;

FIG. 3 shows a larger-scale, partly sectioned front view, with parts removed for clarity, of a detail in FIG. 2;

FIG. 4 shows a larger-scale, partly sectioned front view, with parts removed for clarity, of a detail in FIG. 2;

DETAILED DESCRIPTION

Figure 1:
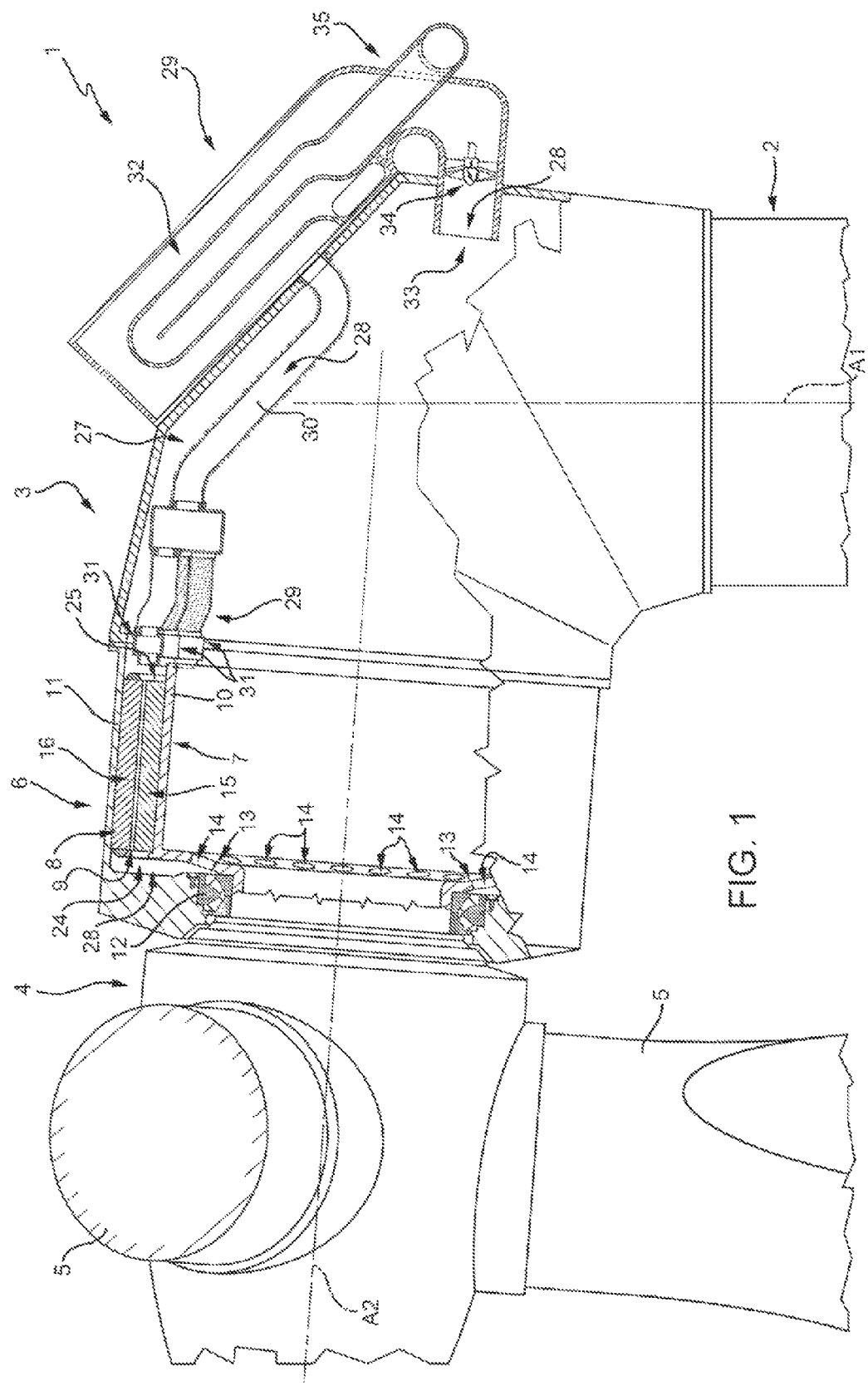
FIG. 1 shows a partly sectioned side view, with parts removed for clarity, of a wind turbine in accordance with the present disclosure.

Referring now to the example embodiments of the present disclosure illustrated in FIGS. 1 to 11, number 1 in FIG. 1 indicates as a whole a wind turbine comprising a pylon 2 (shown partly) extending along a vertical axis A1; a nacelle 3 fitted to the top end of pylon 2 and which rotates with respect to pylon 2 about axis A1; a hub 4 mounted to rotate with respect to nacelle 3 about an axis of rotation A2 crosswise to axis A1; three blades 5 (only two shown in FIG. 1); and an electric machine 6.

Nacelle 3 comprises a hollow body fitted to the top end of pylon 2 to rotate about axis A1, and supports electric machine 6, which comprises a rotor 7 and a stator 8 separated by an annular through channel 9. In the example shown, electric machine 6 is annular; rotor 7 is hollow and comprises a substantially cylindrical rotor supporting structure 10 extending about axis of rotation A2; and stator 8 comprises a substantially cylindrical stator supporting structure 11 extending about axis of rotation A2. Hub 4 is hollow and connected directly to rotor 7, (i.e., to rotor supporting structure 10); and stator 8 is connected to the hollow body of nacelle 3. That is, stator supporting structure 11 is connected directly to the hollow body of nacelle 3, and communicates directly with the outside. In the example shown, stator 8 extends about rotor 7, and electric machine 6 is a synchronous, permanent magnet type. Hub 4 and rotor 7 are connected to each other and supported on a bearing 12, in turn fitted to nacelle 3.

Rotor supporting structure 10 is connected to hub 4, and has an annular sector 13, which extends crosswise to axis of rotation A2, close to bearing 12, and has a plurality of openings 14.

Nacelle 3 and hub 4 are configured so there is no or negligible exchange of air with the outside, (i.e., inside, nacelle 3 and hub 4 define a closed area in which no outside air circulates).

In another variation (not shown), the rotor extends about the stator.

As shown in FIGS. 1 and 2, rotor 7 comprises a plurality of active rotor sectors 15; and stator 8 comprises a plurality of active stator sectors 16 comprising stator windings (not shown in the drawings). Active rotor sectors 15 and active stator sectors 16 are positioned facing and separated by annular through channel 9.

Each active rotor sector 15 comprises magnetized modules 17 and magnetic guides 18, and is fitted to rotor supporting structure 10 to form a straight through channel 19 between active rotor sector 15 and rotor supporting structure 10. Rotor supporting structure 10 is shown schematically in FIG. 2 as one body, and may be defined by a single body (in one piece) with arms 20 configured to support magnetic guides 18, or by a hollow rotor cylinder with grippers bolted to it to support the magnetic guides.

As shown in FIG. 2, each active rotor sector 15 comprises at least two magnetized modules 17 positioned contacting and perfectly facing one another, and stacked radially with respect to axis of rotation A2 (FIG. 1), so as to form groups of magnetized modules 17 arranged successively, parallel to axis of rotation A2 (FIG. 1), along the whole of active rotor sector 15. In other words, each active rotor sector 15 comprises at least two rows of magnetized modules 17.

Magnetized modules 17 are gripped between two magnetic guides 18, each defined by respective packs of laminations.

More specifically, as shown in FIG. 2, each straight through channel 19 is bounded at one side by a respective magnetized module 17 and respective pair of magnetic guides 18, at the other side by rotor supporting structure 10, and laterally by arms 20 of rotor supporting structure 10.

In an alternative embodiment shown in FIGS. 2 and 3, a portion of through channel 19 defined by rotor supporting structure 10 has a serrated profile (shown by dash lines) to increase the heat-exchange surface.

In another alternative embodiment shown in FIGS. 2 and 4, a portion of through channel 19 defined by rotor supporting structure 10 has fins (shown by dash lines) to increase the heat-exchange surface.

Figure 5:
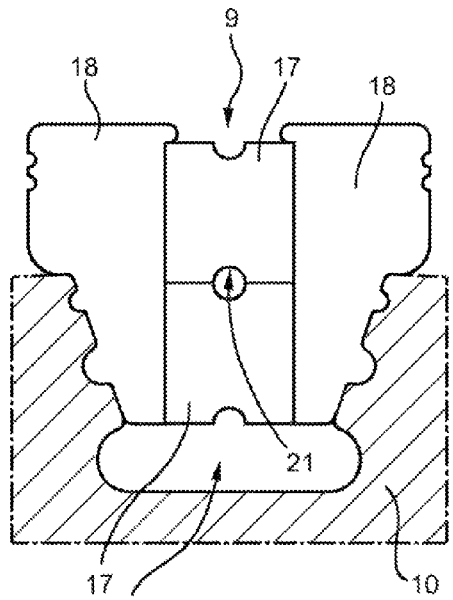
FIG. 5 shows a partly sectioned front view, with parts removed for clarity, of a detail of an alternative embodiment of a wind turbine in accordance with the present disclosure.

In an alternative embodiment shown in FIG. 5, straight through channels 19 comprise intermediate through channels 21 formed between the rows of magnetized modules 17 and therefore parallel to axis of rotation A2. More specifically, magnetized modules 17 in each row are positioned contacting magnetized modules 17 in the other row, and are configured to form at least one intermediate through channel 21.

Figure 6:
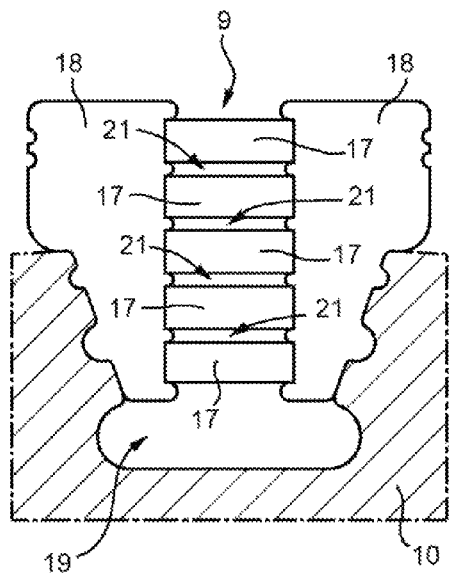
FIG. 6 shows a partly sectioned front view, with parts removed for clarity, of a detail of another alternative embodiment of a wind turbine in accordance with the present disclosure.

In an alternative embodiment shown in FIG. 6, magnetized modules 17 are not positioned contacting; magnetic guides 18 are configured to form seats for magnetized modules 17; and intermediate through channels 21 are defined between adjacent rows of magnetized modules 17.

Figure 7:
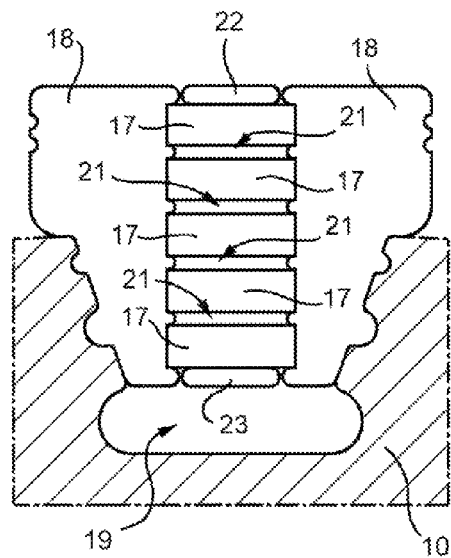
FIG. 7 shows a partly sectioned front view, with parts removed for clarity, of a detail of another alternative embodiment of a wind turbine in accordance with the present disclosure.

In an alternative embodiment shown in FIG. 7, electric machine 6 comprises a protector 22 facing stator 8 and contacting the row of magnetized modules 17 adjacent to stator 8; and a protector 23 facing rotor supporting structure 10 and contacting the row of magnetized modules 17 adjacent to rotor supporting structure 10.

Figure 8:
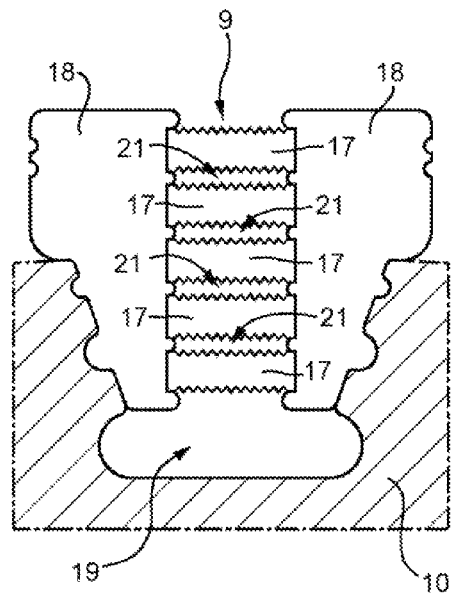
FIG. 8 shows a partly sectioned front view, with parts removed for clarity, of a detail of another alternative embodiment of a wind turbine in accordance with the present disclosure.

In the alternative embodiment in FIG. 8, magnetized modules 17 are configured to increase the heat exchange surface with the cooling fluid inside straight through channels 19 and annular through channel 9.

As shown in FIGS. 1 and 2, annular through channel 9 and straight through channels 19 extend parallel to axis of rotation A2, and are located between rotor supporting structure 10 and stator supporting structure 11 (i.e., extend axially between two opposite ends 24 and 25).

Stator 8 comprises cooling fins 26 fixed to stator supporting structure 11, on the opposite side to active stator sectors 16.

Wind turbine 1 comprises a cooling system 27 fitted to nacelle 3 and comprising a cooling circuit 28 (FIG. 1) configured to cool electric machine 6 with cooling fluid which, in the example shown in the drawings, is gaseous and, in particular, air.

As shown in FIGS. 1 and 2, cooling circuit 28 extends partly along annular through channel 9 and straight through channels 19 to effectively cool magnetized modules 17. In the example shown, the cooling fluid flows along straight through channels 19 and annular through channel 9 from cooling fluid inlet end 24 to cooling fluid outlet end 25 in a direction parallel to axis of rotation A2.

Figure 9:
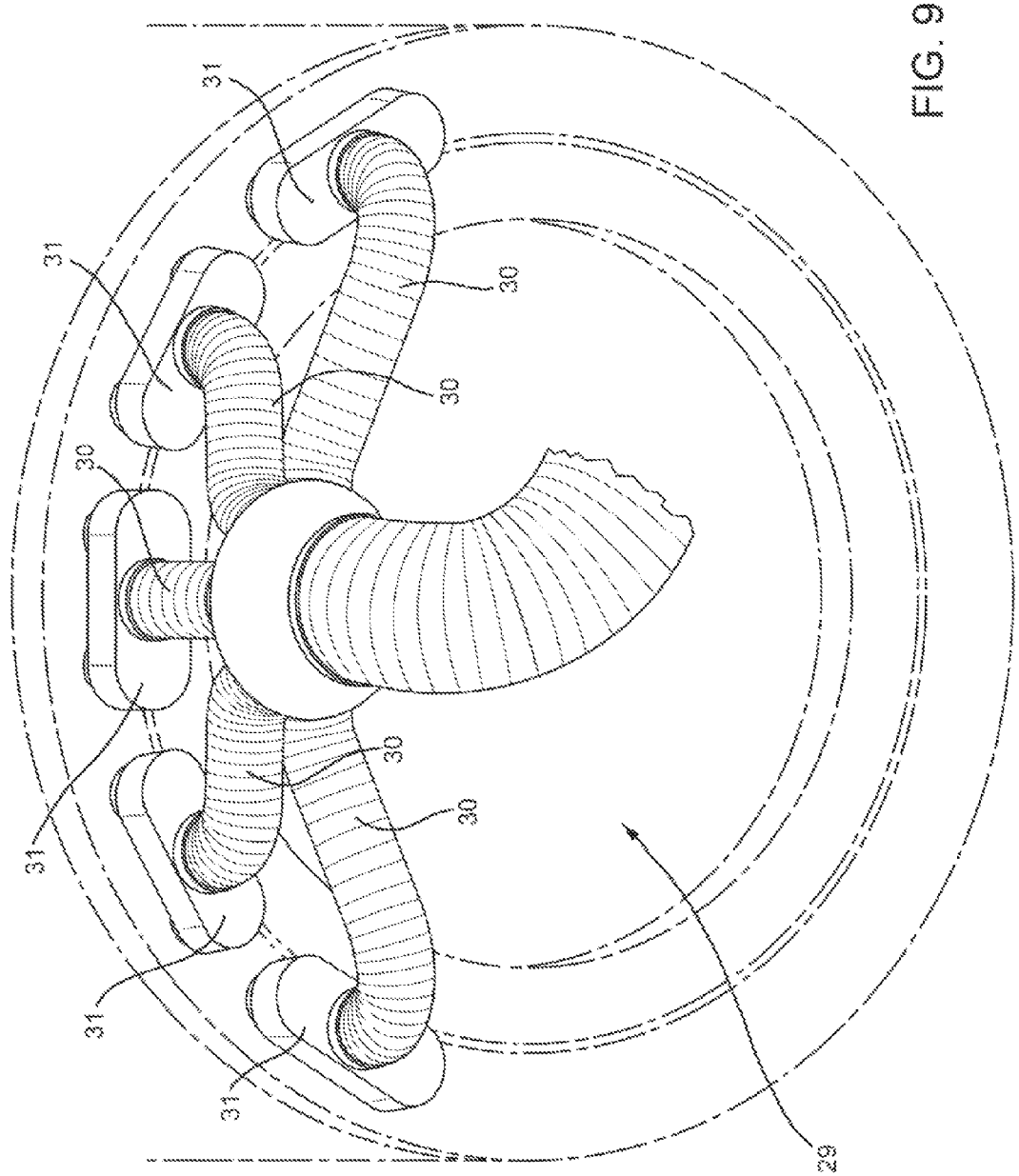
FIG. 9 shows a view in perspective, with parts removed for clarity, of a detail of the FIG. 1 wind turbine.

As shown in FIGS. 1 and 9, cooling system 27 comprises a cooling fluid suction assembly 29, which comprises pipes 30, and suction ports 31 positioned facing outlet end 25 to cover at least one angular sector and feed cooling fluid into annular through channel 9 and straight through channels 19. Cooling circuit 28 is a closed circuit, and extends partly along suction assembly 29. Suction assembly 29 comprises a heat exchanger 32 on the outer surface of nacelle 3 and connected to pipes 30 to receive hot air for cooling; a delivery port 33 configured to feed cooled air into nacelle 3; and a fan 34 located between delivery port 33 and heat exchanger 32 to increase cooled airflow from delivery port 33.

Suction assembly 29 comprises an outer circuit 35 connected to heat exchanger 32 and in which outside air circulates; and heat exchanger 32 cools the air inside nacelle 3 with the outside air from outer circuit 35.

Suction assembly 29 (i.e., pipes 30, suction ports 31, heat exchanger 32, delivery port 33, fan 34, and outer circuit 35) is integral with nacelle 3.

Cooling circuit 28 extends partly, through openings 14, between delivery port 33 and cooling fluid inlet end 24. More specifically, cooling circuit 28 extends partly inside nacelle 3, and depends on the configuration of electric machine 6 and nacelle 3. That is, the low pressure produced by suction ports 31 inside annular through channel 9 and straight through channels 19 draws cooled air through openings 14 from delivery port 33 to inlet end 24 of straight through channels 19 and annular through channel 9.

In actual use, the cooling fluid cooled by heat exchanger 32 is drawn out of delivery port 33 by the low pressure produced by suction port 31 in annular through channel 9 and straight through channels 19, and flows through openings 14 to inlet end 24, from where it is drawn by suction port 31 along annular through channel 9 and straight through channels 19 to outlet end 25. As it flows along annular through channel 9 and straight through channels 19, the cooling fluid withdraws heat from active rotor sectors 15 (i.e., from magnetized modules 17, and from active stator sectors 16). And the hot cooling fluid flows along pipes 30 to heat exchanger 32, which cools utilizing outer circuit 35.

The outside air flows through cooling fins 26, which increase the heat exchange surface between the air and stator supporting structure 11.

Figure 10:
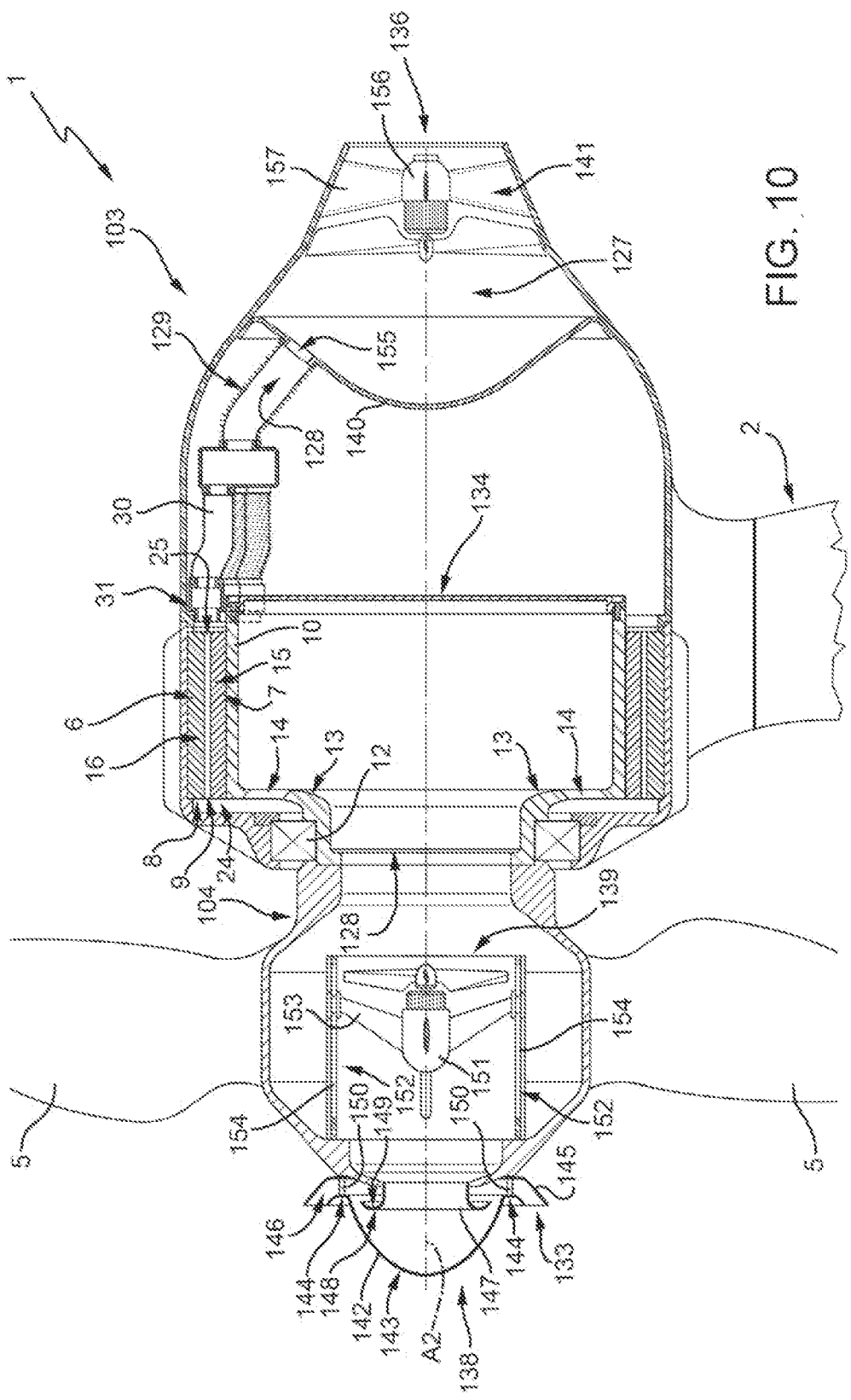
FIG. 10 shows a partly sectioned side view, with parts removed for clarity, of another embodiment of a wind turbine in accordance with the present disclosure.

In the alternative embodiment shown in FIG. 10, parts identical to those of the preceding wind turbine embodiment are indicated using the same reference numbers; heat exchanger 32, delivery port 33, fan 34, and outer circuit 35 of cooling system 27 are omitted; cooling system 27 is replaced by cooling system 127; cooling circuit 28 is replaced by cooling circuit 128; suction assembly 29 is replaced by suction assembly 129; and the cooling fluid is air.

Nacelle 3 and hub 4 are replaced by nacelle 103 and hub 104, both outwardly open.

More specifically, cooling system 127 is supported partly by hub 104 and partly by nacelle 103, is configured to air-cool electric machine 6, and, in particular, feeds cooling air, predominantly in a direction parallel to axis of rotation A2, between a feed opening 133 in hub 104, and an exhaust opening 136 in nacelle 103.

On the opposite side to hub 104, rotor 7 is closed by a panel 134 connected to the inner end of rotor supporting structure 10 and configured to prevent cooling airflow from hub 104 to exhaust opening 136 via the inside of rotor supporting structure 10.

Cooling system 127 comprises, in succession from feed opening 133 to exhaust opening 136, an inlet air filtration device 138; a ventilation device 139; and suction assembly 129 comprising suction ports 31, pipes 30, a panel 140, and a ventilation device 141.

Filtration device 138 is fitted to hub 104 at feed opening 133, and comprises a convex panel 142 located opposite feed opening 133 and having a convex face 143 facing outwards, and an oppositely convex annular edge 144; an annular panel 145 having a concave face 146 extending about edge 144 and facing convex panel 142; and an annular panel 147, which extends inside convex panel 142, and comprises a convex face 148 facing convex panel 142, and a concave face 149 facing hub 104.

Panel 142 is fitted to hub 104 by spacer arms 150, whereas panels 145 and 147 are fitted to hub 104 directly, about feed opening 133. Panels 142, 145, 147 guide the incoming air into hub 104, and are configured and arranged to channel the air inflow along a labyrinth path. Filtration device 138 thus prevents or at least reduces the amount of water, snow, or dirt entering hub 104 and nacelle 103.

Ventilation device 139 is housed inside hub 104, and comprises a powered fan 151; a guide 152 parallel to axis of rotation A2; and a slide 153 supporting fan 151, and which engages and slides along guide 152 in a direction parallel to axis of rotation A2.

Guide 152 comprises rails 154 arranged about and extending parallel to axis of rotation A2; and fan 151 serves to accelerate airflow in a parallel direction towards nacelle 103.

Fan 151 is movable along axis of rotation A2 to enable worker access, and also to set fan 151 to the best operating position.

Panel 140 is fitted to nacelle 103, comprises an opening 155 connected to pipes 30, and is positioned facing ventilation device 141 to guide airflow from suction ports 31 to ventilation device 141.

Ventilation device 141 comprises a fan 156, and brackets 157 configured to fix fan 156 to nacelle 103, close to exhaust opening 136.

In actual use, nacelle 103 is oriented about axis A1 to position axis of rotation A2 in the wind direction, with blades 5 facing into the wind.

Cooling circuit 128 extends partly from feed opening 133 to inlet end 24 of straight through channels 19 and annular through channel 9, via air filtration device 138, ventilation device 139, and opening 14.

In other words, the cooling air flows naturally along the labyrinth path inside feed opening 133, and into hub 104 and nacelle 103.

Cooling circuit 128 also extends partly from inlet end 24 to outlet end 25 of straight through channels 19 and annular through channel 9.

Cooling circuit 128 extends partly from outlet end 25 of straight through channels 19 and annular through channel 9 to exhaust opening 136 via suction ports 31, pipes 30, opening 155, and ventilation device 141.

The cooling air conducted into hub 104 and nacelle 103 is also assisted by fan 151, which serves to overcome any load losses in the cooling airflow, and to accelerate airflow inside hub 104 and nacelle 103.

In other words, the cooling air flowing inside hub 104 is drawn by ventilation device 141 into straight through channels 19 and annular through channel 9, thus cooling rotor 7. More specifically, after flowing through ventilation device 139, the cooling air flows through opening 14, along straight through channels 19 and annular through channel 9, through suction ports 31 into pipes 30, and along pipes 30 to opening 155 in panel 140, where it is drawn out by ventilation device 141 and expelled through exhaust opening 136.

Figure 11:
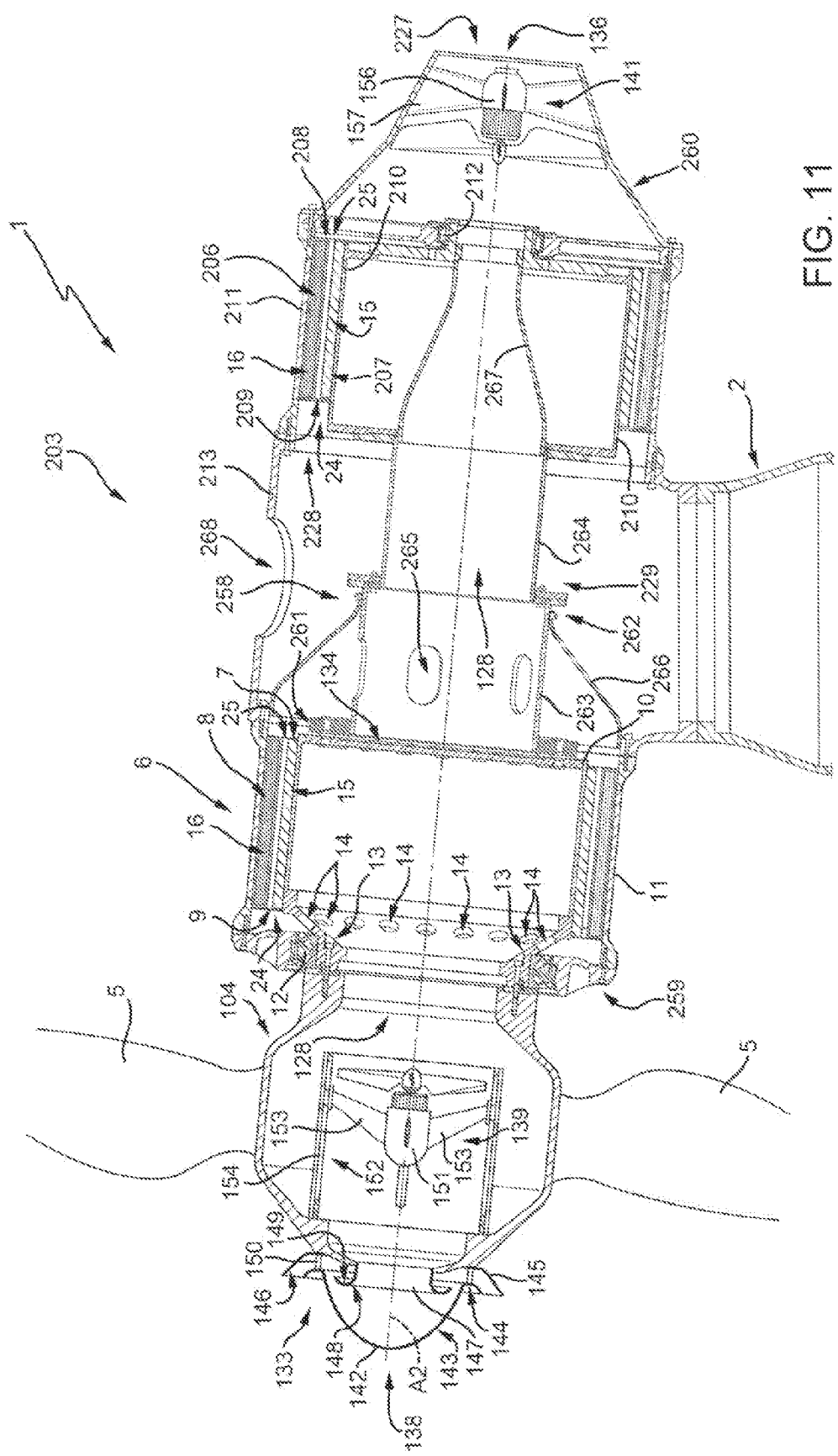
FIG. 11 shows a partly sectioned side view, with parts removed for clarity, of another embodiment of a wind turbine in accordance with the present disclosure.

In FIG. 11, which shows an alternative embodiment to the one in FIG. 10, suction ports 31, pipes 30 and panel 140 are omitted; cooling system 127 is replaced by cooling system 227; suction assembly 129 is replaced by suction assembly 229; nacelle 103 is replaced by nacelle 203; and wind turbine 1 comprises an electric machine 206 comprising a rotor 207 and stator 208 separated by an annular through channel 209. In the example shown, the electric machine 206 is annular; rotor 207 is hollow and comprises a substantially cylindrical rotor supporting structure 210 extending about axis of rotation A2; and stator 208 comprises a substantially cylindrical stator supporting structure 211 extending about axis of rotation A2.

Nacelle 203 comprises a central member 213 in the form of a hollow cylinder.

Stators 8 and 208 are substantially coaxial (i.e., have substantially coincident axes of symmetry), are spaced apart, and are connected by central member 213, which, in the example shown, is interposed between stators 8 and 208. Rotors 7 and 207 are connected by a transmission assembly 258, which transfers rotation from rotor 7 to rotor 207 as shown in FIG. 11.

Hub 104 is fixed directly to rotor 7 to transfer wind-induced rotation to rotor 7.

Central member 213 is fixed to pylon 2 to rotate about an axis crosswise to axis of rotation A2, to position blades 5 into the wind.

Nacelle 203 comprises two annular collars 259, 260 positioned contacting respective stator supporting structures 11, 211, and which define the opposite ends of nacelle 203. Two annular collars 259, 260 are located at the opposite side of the nacelle 203.

Stators 8 and 208, central member 213, and annular collars 259 and 260 define the supporting structure of nacelle 203.

Rotor 207 is connected to collar 260 by a bearing 212 at the end of nacelle 203 adjacent to rotor 207.

Rotor 207 comprises a plurality of active rotor sectors 15; and stator 208 comprises active stator sectors 16 (only one shown in FIG. 11) comprising stator windings (not shown in the drawings). Active rotor sectors 15 and active stator sectors 16 are positioned facing and separated by annular through channel 209.

Each active rotor sector 15 comprises magnetized modules 17 and magnetic guides 18, and is fitted to rotor supporting structure 210 to form a straight through channel 19 between active rotor sector 15 and rotor supporting structure 10.

More specifically, each straight through channel 19 is bounded at one side by a respective magnetized module 17 and respective pair of magnetic guides 18, at the other side by rotor supporting structure 210, and laterally by arms 20 of rotor supporting structure 210.

Rotor supporting structure 210 is shown schematically as one body in the FIG. 11 embodiment, and may be defined by a single body (in one piece) with arms 20 configured to support magnetic guides 18, or by a hollow rotor cylinder with grippers bolted to it to support magnetic guides 18.

With reference to FIG. 11, transmission assembly 258 is deformable to permit relative movement of electric machines 6 and 206.

More specifically, transmission assembly 258 is deformable to permit alignment adjustments and/or relative movement of rotors 7 and 207.

Transmission assembly 258 comprises an annular elastic joint 261; and a transmission shaft 262 comprising a hollow cylinder 263 connected to rotor 7 by elastic joint 261, and a hollow cylinder 264 connected at one end to hollow cylinder 263 by flanges, and at the other end to rotor 207.

Elastic joint 261 is deformable elastically to reduce stress transmitted to rotor 207 by movement of rotor 7 caused by stress transmitted from blades 5. Transmission shaft 262 has openings 265 in hollow cylinder 263 to allow cooling air into hollow cylinder 263, and which are large enough to enable worker access into transmission shaft 262.

Exhaust opening 136 is located at annular collar 260 on nacelle 203, on the opposite side to feed opening 133 and at rotor 207.

Cooling system 227 also comprises a truncated-cone-shaped baffle 266 with two annular ends. Baffle 266 is connected at the larger-diameter annular end to the end of stator 8 opposite hub 104, is connected at the smaller-diameter annular end to hollow cylinder 263, close to the flanges connecting it to hollow cylinder 264, and is configured to direct cooling air from outlet end 25 of straight through channels 19 and annular through channel 9 through openings 265 into hollow cylinder 263 (i.e., defines a suction port). Cooling system 227 also comprises a truncated-cone-shaped baffle 267 located inside rotor 207, and which is connected at one end to hollow cylinder 264, and at the other end to annular collar 260, close to bearing 212. Central member 213 has cooling air inlet openings 268. And baffles 266, 267, transmission shaft 262, and ventilation device 141 are all functional parts of suction assembly 229.

Panel 134 of rotor 7 is located at transmission shaft 262 and positioned perpendicular to axis of rotation A2 to prevent cooling airflow from hub 104 to transmission shaft 262 via rotor supporting structure 10. And supporting structure 210 extends up to hollow cylinder 264 to form a closed area and prevent the cooling air from openings 268 in central member 213 from flowing into rotor 207.

In this embodiment, cooling circuit 128 extends partly from outlet end 25 of straight through channels 19 and annular through channel 9 to exhaust opening 136 via baffle 266, transmission shaft 262, baffle 267, annular collar 260 and ventilation device 141. Cooling system 227 also comprises a cooling circuit 228, which extends partly from opening 268 in central member 213 to inlet ends 24 of straight through channels 19 and annular through channel 209 of electric machine 206, extends partly from inlet ends 24 to outlet ends 25 of straight through channels 19 and annular through channel 209 of rotor 207 of electric machine 206, and extends from outlet ends 25 of straight through channels 19 and annular through channel 209 of rotor 207 of electric machine 206 to exhaust opening 136.

Cooling system 227 cools rotors 7 and 207 utilizing two cooling circuits 128, 228 traversed by two separate streams of cooling air. Rotor 7 is cooled by a first stream defined by the cooling air which flows through feed opening 133 into hub 104, flows through fan 151, and is diverted into straight through channels 19 and annular through channel 9 through openings 14 in rotor supporting structure 10. The cooling air flowing along straight through channels 19 and annular through channel 9 heats up, and is diverted by baffle 266 through openings 265 into hollow cylinder 263; and the hot cooling air is drawn by fan 156 along hollow cylinder 264, through baffle 267 and out through exhaust opening 136. Rotor 207 is cooled by a second stream, which flows in through openings 268 in central member 213, is drawn by fan 156 towards straight through channels 19 and annular through channel 209 in electric machine 206, flows along straight through channels 19 and annular through channel 209 in electric machine 206 in a direction parallel to axis of rotation A2, and is drawn out by fan 156 through exhaust opening 136.

The present disclosure provides for effectively cooling rotors 7 and 207, and for eliminating certain of the drawback of certain of the known art, whereby rotor 207 is cooled by cooling air already used to cool rotor 7. By virtue of the present disclosure, the second stream of cooling air is therefore colder than in the known art.

The present disclosure also extends to embodiments not described in detail herein, as well as equivalent embodiments within the protective scope of the accompanying Claims. That is, changes may be made to the present disclosure without, however, departing from the scope of the present disclosure as defined in the accompanying Claims. It should thus be understood that various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A fluid-cooled wind turbine comprising:
   at least one electric machine including:
      a stator including:
         a stator supporting structure, and
         a plurality of active stator sectors supported by the stator supporting structure; and
      a rotor configured to rotate about an axis of rotation and including:
         a rotor supporting structure, and
         a plurality of active rotor sectors supported by the rotor supporting structure, each active rotor sector including at least two rows of magnetized modules stacked radially with respect to the axis of rotation; and
   a cooling system including:
      a cooling circuit partly defined by a plurality of through channels adjacent to at least one of: the active rotor sectors and the active stator sectors, wherein:
         (i) the plurality of through channels include a plurality of first through channels, (ii) each first through channel is adjacent to a respective one of the active rotor sectors, and
(iii) the plurality of first through channels include a plurality of intermediate through channels, each of the intermediate through channels is bounded by two rows of the at least two rows of the magnetized modules of a respective one of the active rotor sectors.

2. The fluid-cooled wind turbine of claim 1, wherein the plurality of through channels include:
an annular through channel extending about the axis of rotation, and
are adjacent to the active rotor sectors and active stator sectors.

3. The fluid-cooled wind turbine of claim 1, wherein each first through channel is bounded by the rotor supporting structure and by one of the active rotor sectors.

4. The fluid-cooled wind turbine of claim 3, wherein:
each active rotor sector includes at least one row of magnetized modules extending parallel to the axis of rotation, and
each first through channel is bounded by the row of magnetized modules of the respective one of the active rotor sectors.

5. The fluid-cooled wind turbine of claim 4, wherein each first through channel extends parallel to the axis of rotation.

6. The fluid-cooled wind turbine of claim 1, wherein the two rows of magnetized modules are spaced radially apart.

7. The fluid-cooled wind turbine of claim 1, wherein the intermediate through channels extend parallel to the axis of rotation.

8. The fluid-cooled wind turbine of claim 1, wherein the plurality of through channels extend, parallel to the axis of rotation, between a cooling fluid inlet end and a cooling fluid outlet end.

9. The fluid-cooled wind turbine of claim 8, wherein the cooling circuit extends through a plurality of openings formed in the rotor supporting structure and is configured to feed a cooling fluid to the cooling fluid inlet end of the through channels.

10. The fluid-cooled wind turbine of claim 1, which includes:
another electric machine including:
another stator including:
another stator supporting structure, and
another plurality of active stator sectors supported by the other stator supporting structure, and
another rotor including:
another rotor supporting structure and
another plurality of active rotor sectors supported by the other rotor supporting structure;
a transmission assembly connecting the rotor to the other rotor; and
a cooling system including another cooling circuit partly defined by a plurality of other through channels adjacent to at least one of: the other active rotor sectors and the other active stator sectors.

11. The fluid-cooled wind turbine of claim 1, wherein a cooling fluid is air.

12. The fluid-cooled wind turbine of claim 1, wherein the first through channels include straight through channels.

13. A wind turbine cooling system comprising:
a cooling circuit partly defined by a plurality of through channels adjacent to at least one of:
(a) a plurality of active rotor sectors of a rotor of at least one electric machine, said plurality of active rotor sectors supported by a rotor supporting structure, said rotor being configured to rotate about an axis of rotation and each active rotor sector including at least two rows of magnetized modules stacked radially with respect to the axis of rotation; and
(b) a plurality of active stator sectors of a stator of the at least one electric machine, said plurality of active stator sectors supported by a stator supporting structure;
wherein:
(i) the plurality of through channels include a plurality of first through channels,
(ii) each first through channel is adjacent to a respective one of the active rotor sectors, and
(iii) the plurality of first through channels include a plurality of intermediate through channels, each of the intermediate through channels is bounded by two rows of the at least rows of the magnetized modules of a respective one of the active rotor sectors.

14. The wind turbine cooling system of claim 13, wherein the first through channels include straight through channels.

15. A fluid-cooled wind turbine comprising:
at least one electric machine including:
a stator including:
a stator supporting structure, and
a plurality of active stator sectors supported by the stator supporting structure; and
a rotor configured to rotate about an axis of rotation and including:
a rotor supporting structure, and
a plurality of active rotor sectors supported by the rotor supporting structure, each active rotor sector including at least two rows of magnetized modules; and
a cooling system including:
a cooling circuit including a suction assembly which partially defines the cooling circuit, said cooling circuit being partly defined by a plurality of through channels adjacent to at least one of: the active rotor sectors and the active stator sectors, wherein:
(i) the plurality of through channels include a plurality of first through channels, wherein the plurality of through channels extend, parallel to the axis of rotation, between a cooling fluid inlet end and a cooling fluid outlet end,
(ii) each first through channel is adjacent to a respective one of the active rotor sectors,
(iii) the plurality of first through channels include a plurality of intermediate through channels, each of the intermediate through channels is bounded by two rows of the at least two rows of the magnetized modules of a respective one of the active rotor sectors, and
(iv) the suction assembly is configured to draw cooling fluid from the cooling fluid outlet end of the plurality of through channels.

16. The fluid-cooled wind turbine of claim 15, wherein the suction assembly includes at least one suction port facing the cooling fluid outlet end of the through channels.

17. The fluid-cooled wind turbine of claim 16, wherein the at least one suction port is coupled to the stator supporting structure.

18. The fluid-cooled wind turbine of claim 15, which includes a nacelle coupled to the stator supporting structure, wherein:
the cooling circuit is a closed circuit,
the suction assembly includes a heat exchanger and a cooling fluid delivery port inside the nacelle, and the cooling circuit extends partly between the cooling fluid delivery port and the cooling fluid inlet end of the plurality of through channels.

19. The fluid-cooled wind turbine of claim 15, which includes a nacelle, wherein:
the cooling circuit is an open circuit, and
the suction assembly extends between the cooling fluid outlet end of the plurality of through channels and an exhaust opening in the nacelle.

20. The fluid-cooled wind turbine of claim 19, wherein:
the cooling system includes a cooling fluid feed opening, and
the cooling circuit extends partly between the cooling fluid feed opening and the cooling fluid inlet end of the through channels.

21. The fluid-cooled wind turbine of claim 20, which includes a hub, wherein the cooling fluid feed opening is formed in the hub.

22. The fluid-cooled wind turbine of claim 19, wherein the cooling fluid feed opening is formed in the nacelle.

23. A fluid-cooled wind turbine comprising:
at least one electric machine including:
a stator including:
a stator supporting structure, and
a plurality of active stator sectors supported by the stator supporting structure; and
a rotor configured to rotate about an axis of rotation and including:
a rotor supporting structure, and
a plurality of active rotor sectors supported by the rotor supporting structure, each active rotor sector including at least two rows of magnetized modules;
another electric machine including:
another stator including:
another stator supporting structure, and
another plurality of active stator sectors supported by the other stator supporting structure, and
another rotor including:
another rotor supporting structure, and
another plurality of active rotor sectors supported by the other rotor supporting structure;
a transmission assembly connecting the rotor to the other rotor, the transmission assembly including a hollow transmission shaft; and
a cooling system including:
a suction assembly which partially defines the cooling circuit and which extends partly inside the transmission shaft;
a cooling circuit partly defined by a plurality of through channels adjacent to at least one of: the active rotor sectors and the active stator sectors, wherein:
(i) the plurality of through channels include a plurality of first through channels,
(ii) each first through channel is adjacent to a respective one of the active rotor sectors,
(iii) the plurality of first through channels include a plurality of intermediate through channels, each of the intermediate through channels is bounded by two rows of the at least two rows of the magnetized modules of a respective one of the active rotor sectors, and
(iv) the suction assembly is configured to draw cooling fluid from an outlet end of the plurality of through channels in the electric machine; and
another cooling circuit partly defined by a plurality of other through channels adjacent to at least one of: the other active rotor sectors and the other active stator sectors.

24. The fluid-cooled wind turbine of claim 23, wherein:
the transmission shaft includes a first hollow cylinder including a plurality of openings; and
the suction assembly includes at least one suction port defined by an annular baffle extending about the first hollow cylinder and configured to guide cooling fluid from the outlet end of the plurality of through channels in the electric machine into the transmission shaft.

25. The fluid-cooled wind turbine of claim 24, wherein the suction assembly includes another annular baffle extending inside the other rotor, connected to the transmission shaft, and configured to guide cooling fluid from inside the transmission shaft to an exhaust opening in a nacelle.

* * * * *

UNITED STATES PATENT AND TRADEMARK OFFICE
CERTIFICATE OF CORRECTION

PATENT NO. : 9,209,665 B2
APPLICATION NO. : 14/003717
DATED : December 8, 2015
INVENTOR(S) : Matteo Casazza, Georg Folie and Emmanuele Gelmini It is certified that error appears in the above-identified patent and that said Letters Patent is hereby corrected as shown below:

ON THE TITLE PAGE OF THE PATENT, item (75) should read:

Inventors: Matteo Casazza, Val di Vizze (IT);
Georg Folie, Val di Vizze (IT);
Emmanuele Gelmini, Trento (IT)

Signed and Sealed this
Twenty-eighth Day of June, 2016

Michelle K. Lee
*Director of the United States Patent and Trademark Office*